United States Patent
Hwu et al.

(10) Patent No.: US 6,681,387 B1
(45) Date of Patent: Jan. 20, 2004

(54) METHOD AND APPARATUS FOR INSTRUCTION EXECUTION HOT SPOT DETECTION AND MONITORING IN A DATA PROCESSING UNIT

(75) Inventors: Wen-mei William Hwu, Champaign, IL (US); Matthew Carl Merten, Champaign, IL (US); Andrew Raymond Trick, Champaign, IL (US); Christopher Neith George, Urbana, IL (US); John Christopher Gyllenhaal, Livermore, CA (US)

(73) Assignee: Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 09/520,474

(22) Filed: Mar. 8, 2000

Related U.S. Application Data
(60) Provisional application No. 60/168,481, filed on Dec. 1, 1999.

(51) Int. Cl.[7] .............................. G06F 9/45; G06F 9/44; G06F 12/00; G06F 15/00; H02H 3/05
(52) U.S. Cl. .................. 717/158; 717/127; 717/131; 711/1; 712/234; 714/38
(58) Field of Search ................... 717/151–161, 717/127, 131; 711/1, 118–132; 712/23, 26, 203, 216, 219, 233–241; 714/38, 47, 50

(56) References Cited

U.S. PATENT DOCUMENTS

| | | | |
|---|---|---|---|
| 4,839,822 A | 6/1989 | Dormond et al. ............ 706/45 |
| 4,969,088 A | * 11/1990 | McAuliffe et al. .......... 709/241 |
| 5,151,981 A | 9/1992 | Westcott et al. ............. 714/50 |
| 5,452,457 A | 9/1995 | Alpert et al. ................ 717/153 |
| 5,488,713 A | 1/1996 | Norton et al. ................ 703/22 |
| 5,557,557 A | 9/1996 | Frantz et al. ................ 703/22 |
| 5,613,118 A | 3/1997 | Heisch et al. ............... 717/158 |
| 5,815,719 A | 9/1998 | Goebel ....................... 717/158 |
| 5,850,552 A | 12/1998 | Odani et al. ................ 717/156 |
| 6,115,809 A | * 9/2000 | Mattson et al. ............. 712/239 |
| 6,275,981 B1 | * 8/2001 | Buzbee et al. .............. 717/158 |
| 6,311,261 B1 | * 10/2001 | Chamdani et al. ........... 712/23 |
| 6,327,704 B1 | * 12/2001 | Mattson et al. ............. 717/153 |
| 6,463,582 B1 | * 10/2002 | Lethin et al. ............... 717/158 |

FOREIGN PATENT DOCUMENTS

| | | | |
|---|---|---|---|
| EP | 0 778 521 A2 | 6/1997 | ............. G06F/9/45 |
| EP | 0 806 725 A2 | 11/1997 | ............. G06F/9/45 |
| WO | WO 98/37465 | 8/1998 | ........... G05B/13/04 |
| WO | WO 99/08187 | 2/1999 | ........... G06F/9/445 |

OTHER PUBLICATIONS

G. Ammons, T. Ball and J. R. Larus, "Exploiting Hardware Performance Counters with Flow and Context Sensitive Profiling," 1997 ACM SIGPLAN Conference on Programming Language Design and Implementation, Las Vegas, Nevada, Jun. 1997.

(List continued on next page.)

*Primary Examiner*—Hoang-Vu Antony Nguyen-Ba
(74) *Attorney, Agent, or Firm*—Gardner Carton & Douglas LLC (57) ABSTRACT

Disclosed is a method and apparatus for detecting and monitoring program hot spots during execution that may be implemented in hardware. A hot spot detector tracks branch instructions which are retired. Frequently executed branch instruction addresses within a particular interval are designated as hot spot candidates. A hot spot detection counter is used to track non-hot spot branches and hot spot candidate branches. When hot spot candidate branches are frequently encountered compared to non-hot spot candidate branches, the hot spot detector may notify the operating system and hot spot candidate branch addresses may be supplied to a runtime optimizing compiler and a monitor table or a hot spot monitor. The hot spot monitor may disable the hot spot detector when a program is operating in known hot spots and may enable the hot spot detector if the program has strayed from known hot spots.

59 Claims, 5 Drawing Sheets

OTHER PUBLICATIONS

T. . Conte, K. N.Menezes and M. A. Hirsch, "Accurate and Practical Profile–Driven Compilation Using the Profile Buffer," *IEEE*, pp. 36–45, 1996.

J. M. Anderson, L. M. Berc, J. Dean, S. Ghemawat, M. R. Henzinger, S. A. Leung, R. L. Sites, M. T. Vandevoorde, C. A. Waldspurger and W. E. Weihl, "Continuous Profiling: Where Have All the Cycles Gone?" *SRC Techical Note 1997—016A*, Modified Sep. 3, 1997.

J. Dean, J. E. Hicks, C. A. Waldspruger, W. E. Weihl and G. Chrysos, "ProfileMe: Hardward Support for Instruction–Level Profiling on Out–of–Order Processors," *IEEE*, PP. 292–302, 1997.

T.M. Conte;, B. A. Patel, K. N. Menezes and J. S. Cox, "Hardware–Based Profiling: An Effective Technique for Profile–Driven Optimization," Department of Electrical and Computer Engineering, North Carolina State University, Raleigh, North Carolina–Undated–.

* cited by examiner

METHOD AND APPARATUS FOR INSTRUCTION EXECUTION HOT SPOT DETECTION AND MONITORING IN A DATA PROCESSING UNIT

CROSS-REFERENCE TO RELATED PATENT APPLICATIONS

This patent application claims the benefit of U.S. Provisional Patent Application No. 60/168,481, filed Dec. 1, 1999.

This invention was made with Government support under contract Number CCR-9809404 awarded by the National Science Foundation (NSF). The Government has certain rights in the invention.

FIELD OF THE INVENTION

The present invention relates generally to program profiling, and relates more particularly to a technique for hot spot detection and monitoring that may be implemented in hardware to support adaptive runtime optimization.

BACKGROUND OF THE INVENTION

Traditionally, program runtime performance has been enhanced through optimization performed in connection with compilation. In some cases, compiler optimization is based upon profile information (such as statistics about frequency of execution of conditionally executed statements) gathered from execution of a program with a set of sample inputs. This is an inherently static technique, however, since the program performance is optimized only for a the set of sample inputs, possibly at the expense of other inputs. In other words, if the inputs to the program differ from the inputs considered by a compiler during optimization, the optimized program may actually perform worse on the different inputs than an unoptimized program.

A number of different techniques have been used to gather profile information about programs. Traditionally, the program is augmented with additional instructions that incrementally collect a profile of the program as it executes. Since these additional instructions are executed frequently, significant slow down of the program being profiled is often observed. Recently, low-overhead profiling techniques have been proposed where the microprocessor contains extra hardware designed to collect profile information. The profile information may then be analyzed to determine if the program performance may be improved or optimized. The basic approach of this technique, however, requires gathering profile information for the program's entire execution which is then averaged into a large database that is then fed back into a static compiler. The disadvantage of this technique is that it does not automatically filter out data that is most useful for optimization. Instead, another process must analyze the complete data set, searching for optimization opportunities. Because the profile data for a program's entire execution is often quite large, storing the data may require more space than is available, and analyzing the data may take an undesirably long time. Furthermore, because an entire profile of the program must be continuously maintained at runtime, the profile represents only average behavior across an extended period of time, and it is difficult to detect variations in program behavior because only long term average behavior is tracked.

Although such static optimization techniques are useful to increase program performance in some respects, additional opportunities for optimization may be realized through dynamic or adaptive techniques capable of monitoring and reporting program performance based upon specific runtime information. In particular, certain runtime optimizers have been proposed that gather program performance information during execution of a program and such information is made available to a dynamic optimizer that may modify program code while the program is running in an attempt to improve program execution accordingly.

U.S. Pat. No. 5,151,981 for Instruction Sampling Instrumentation discloses a hardware implemented technique that allows for periodic sampling of instructions that are executing. According to the technique, each time a predetermined instruction is executed, information associated with the execution of the instruction is stored. Although this approach results in gathering of information that may be useful for runtime optimization, the approach requires interruption of the processor to copy out data gathered when the memory buffer is full and also requires interruption of the processor when the predetermined instruction to be monitored is changed. This technique does not provide a means for automatically detecting optimization opportunities among the data that are collected.

U.S. Pat. No. 5,452,457 for Program Construct and Methods/Systems for Optimizing Assembled Code for Execution discloses a software implemented technique that includes gathering, by means of executing additional instructions, information that may be used to perform optimizations that are environment-specific. However, as a software implemented technique, it requires substantial overhead that detracts from its overall objective of improving program performance.

SUMMARY OF THE INVENTION

The foregoing limitations and disadvantages of the prior art are overcome by the present invention which provides a technique that may be implemented in hardware for supporting runtime optimization. An important observation fundamental to the present invention is that when a collection of intensively executed program blocks also has a small static footprint, it represents a highly favorable opportunity for runtime optimization. Such a set of blocks and their corresponding periods of execution are referred to as "hot spots"—a set of intensively executed instructions. The present invention involves dynamic runtime hot spot detection, as well as hot spot monitoring to determine whether program execution has strayed from a set of hot spots that have previously been detected. Thus, a hot spot detector may be selectively enabled or disabled, depending upon whether detected hot spot portions of a program are currently being executed. Once a hot spot is detected, information regarding the hot spot may be supplied to an operating system or other supervisory process for an opportunity to optimize the hot spot to enhance overall program performance.

Several advantages of the present invention over the techniques proposed by the prior art are realized. First, the technique of the present invention provides for rapidly detecting hot spots by continuously monitoring program execution rather than relying upon statistical sampling as taught in the prior art. Thus hot spot information is almost immediately available for optimization opportunities during execution. Second, hot spots are detected during timeslices of execution, rather than over the entire execution of a program, so that optimizations can adjust the program to changes in its behavior throughout execution. Third, a processor is interrupted or an operating system or other supervisory process is notified only when a hot spot has been detected, resulting in minimal interference with normal execution. Fourth, since the technique may be implemented in hardware independent of other hardware mechanisms in a data processing unit, it will not significantly degrade processor performance, complicate the rest of the processor design or increase cycle time.

BRIEF DESCRIPTION OF THE DRAWINGS

The above and other advantages of the invention will be more clearly appreciated from the following detailed description when taken in conjunction with the accompanying drawings, in which.

The invention is described herein in connection with certain exemplary embodiments and implementations. In particular, although the simplicity and design of the invention lends itself to being advantageously implemented in hardware, it may alternatively be advantageously implemented in software as well. Although the invention is described and illustrated in connection with an embodiment where hot spots are detected and monitored, it may readily be implemented to detect and monitor other program execution behavior of interest as well. For example, the invention may be used to detect and monitor program behavior associated with particular memory usage characteristics by tracking "hot" memory locations (a collection of intensely accessed memory locations) instead of hot instructions. From this, profiling information could be gathered about the access frequency of "hot" memory locations or the values and sizes being stored in those locations. Similarly, the invention could be adapted to track hot cache lines, collecting profile information about the usage patterns of the data elements in the cache line (such as whether or not other data elements in the cache line are also accessed shortly after one element, or if an accessed element is a lone access to the cache line). In another alternative arrangement, the invention could be used to track other types of instructions, instead of just branches as described herein. Some architectures have conditionally executed instructions based on the value contained in a register, a technique called predication. The invention could be used to collect profile information on the frequency of execution of conditionally executed instructions.

Thus, it should be understood that the following description and illustrations of various exemplary embodiments is not intended to limit the invention to those particular embodiments. It is intended that the invention described herein in connection with various exemplary embodiments covers all alternatives, modifications and equivalents falling within the scope and spirit of the invention defined by the appended claims.

DETAILED DESCRIPTION OF THE INVENTION

According to one embodiment of the invention, the detection of runtime optimization opportunities consists of two stages. In the first stage, a profiler detects hot spots as they develop during execution. This may be accomplished by tracking the execution frequency of code blocks across a relatively short period of time. When a set of blocks fit the characteristics of a hot spot, the profiler notifies the runtime optimizer. Once detected, the hot spots may be added to a monitor table and the profiling hardware may be disabled. In the second stage, program execution is monitored to determine if execution strays from the hot spots previously detected. In such a case, the profiler may be enabled once again to allow for detection of new hot spots.

According to one embodiment of the invention, three characteristics are considered in determining whether a region of code classifies as a hot spot: (1) the region must have a relatively small static code size to facilitate rapid optimization, (2) the region must be active over a certain minimum time interval so that it is likely to have an opportunity to benefit from runtime optimization, and (3) the instructions in the selected region of code must account for a large majority of the dynamic execution during its active time interval.

The invention may be implemented based upon three major components. First, a hot spot detector is provided that identifies program hot spots and associated information during execution. Second, a hot spot monitor is provided that maintains information regarding a collection of hot spots that have previously been discovered by the hot spot detector. Third, operating system support is provided that controls the flow of information from the hot spot detector to the hot spot monitor, and may additionally call and supply information to a runtime optimizer. According to this arrangement, the invention advantageously performs hot spot detection and monitoring such that processor interruption only occurs when a new optimization opportunity is detected.

Figure 1:
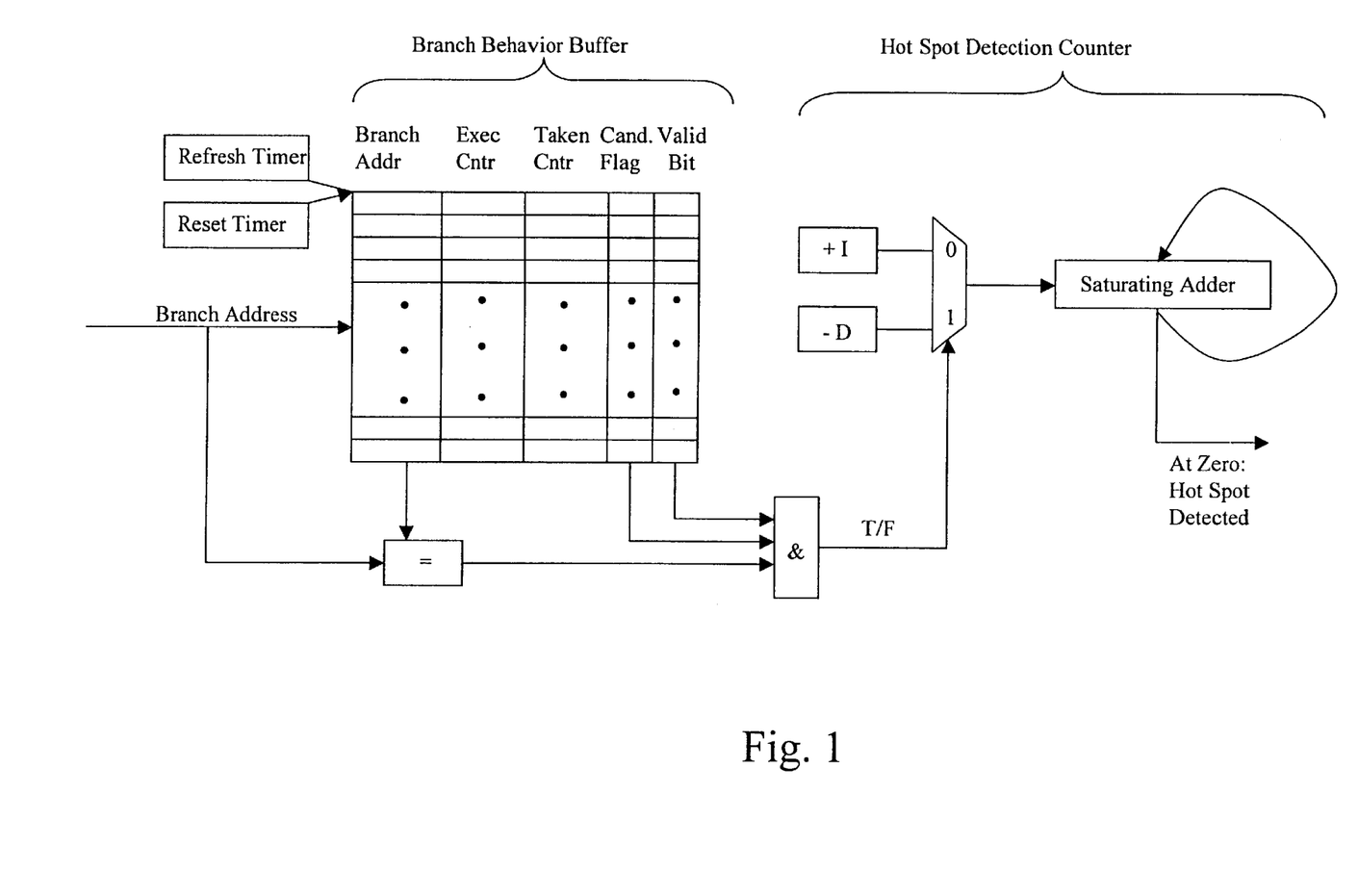
FIG. 1 is a schematic diagram illustrating the components of the hot spot detector in accordance with one embodiment of the present invention.

Turning now to FIG. 1, there is illustrated by way of example the components of a hot spot detector in accordance with an embodiment of the invention. The components of the hot spot detector include a branch behavior buffer, a refresh timer, a reset timer, and a hot spot detection counter that may be implemented as a saturating up-down counter.

According to one embodiment of the invention, the branch behavior buffer may be comprised of a memory buffer having fields for information pertaining to a branch address, branch execution counter, branch taken counter, branch candidate flag and a valid entry bit. As illustrated, the branch behavior buffer provides for a plurality of different entries. The valid entry bit serves as an indicator of whether a particular entry is available. If a valid entry bit is set, this indicates that the entry is full and the branch address and other information is filled in. If the valid entry bit is cleared, the entry is available for new branch information. As will be explained in greater detail, according to one embodiment of the invention, when the hot spot detector is enabled, an entry may be made in the branch behavior buffer when the processor retires a branch instruction. For efficiency, the branch behavior buffer may be indexed based upon the branch address of a branch instruction. Other information relating to the branch instruction, such as branch direction and target address, may also be used (alone or in combination) as an index into the branch behavior buffer. When a branch instruction is retired, the index is determined and the associated execution counter is incremented, and, if the branch is taken (which may be determined, for example, by checking the program counter), the branch taken counter may be incremented as well. As will be apparent, the combination of the values of the branch execution counter and the branch taken counter constitutes an arc weight profile of the recently executed code. If the execution counter reaches its maximum value for the data size allocated for that field within the buffer, preferably there will be no further incrementation of the execution or taken counter in order to accurately preserve the ratio between the execution and taken counters.

In the event that the execution of a particular branch is frequent enough during a particular interval such that the associated execution counter exceeds a predetermined candidate threshold, a candidate flag will be set for the associated branch address. The candidate flag will remain set while the execution counter and taken counter, as appropriate, continue to be incremented accordingly. As will be evident, the candidate flag may be represented by a single bit associated with a particular branch address within the branch behavior buffer. Likewise, the valid entry bit may be represented by a single bit.

To ensure that only frequently executing branches are marked as candidates and to prevent less frequently executing branches from monopolizing entries in the branch behavior buffer, a refresh timer is provided that periodically clear entries from the branch behavior buffer that are not yet marked as candidates (i.e., having a candidate flag set). The refresh timer may be simply implemented as a counter that counts up (or down) to a certain trigger value which, when reached, initiates a process that clears branch behavior buffer entries for which the candidate flag is not set. This periodic refreshing of the branch behavior buffer allows for more efficient use of the buffer space for branches that are more frequently executed. According to an important aspect of the present invention, in addition to the refresh timer, there is provided a reset timer that, when triggered, clears the entire branch behavior buffer. According to the illustrated embodiment of the invention, the reset timer is decremented once for each branch instruction encountered. When it reaches zero, all of the entries in the branch behavior buffer are cleared by clearing all the valid bits, thus making room for new branches. The difference between the reset timer and the refresh timer, however, is that the reset timer interval is much longer and upon triggering, it clears the entire branch behavior buffer. In other words, when initialized or reset, the reset timer will hold a value that is much greater than the refresh timer. In addition, the refresh timer upon triggering clears only those entries where the candidate flag is not set, while the reset timer clears all entries of the branch behavior buffer. The reset timer interval, i.e., the initial value of the timer before any decrementing, should be large enough to allow the hot spot detector to saturate on valid hot spots but also small enough to allow quick identification of a new phase of execution. In order to clear branch behavior buffer entries, it is not necessary to clear each field for the entries. Instead, the valid entry bits for the entries may be cleared.

Although according to the illustrated embodiment, the refresh and reset timers are decremented upon encountering a branch instruction and are triggered when the counter is exhausted, other implementations are possible as well. For example, the timers could be decremented by clock pulses instead of encountering branch instructions, such that the timers are independent of the number of branch instructions encountered. In another embodiment, a wall clock timer could periodically clear the branch behavior buffer. Processors commonly use wall clock timers to interrupt processing at regular intervals. The same signal could also be used to clear the branch behavior buffer. In accordance with an important aspect of the present invention, there is provided a saturating counter that is used in hot spot detection. As illustrated, each time a branch instruction is encountered, the branch behavior buffer is checked for a corresponding entry. If an entry exists (the branch address matches the entry address and its valid bit is set) and the entry candidate flag is set (indicating the branch instruction is a hot spot candidate), then the counter is decremented by a predetermined value D. If any entry does not exist or, if the candidate flag is not set (indicating the branch address has not been recognized as a hot spot candidate) then the detection counter is incremented by a predetermined value I. According to a preferred embodiment, the incrementing and decrementing of the detection counter is weighted in order to provide stability and more meaningful hot spot detection results. For example, the value of I and D may be set at 2 and 1 respectively such that the detection counter is incremented by 2 each time a branch instruction is encountered that does not have its candidate flag marked, and is decremented by 1 each time a branch instruction is executed that has its candidate flag marked. The weighting of I and D determine how sensitive the hot spot detection counter is to the execution of candidate branches. Increasing the value of D increases the sensitivity of the detection counter. That is, a smaller percentage of the branches must be candidates for the detection counter to decrease toward zero. Likewise, decreasing the value of D decreases the sensitivity of the detection counter to candidate branches. Naturally, changing the value of I has the opposite effect.

Another important preferred characteristic of the saturating detection counter is that when at its maximum value it remains at its maximum value when there is an attempt to increment it. In other words, it does not reset (or "rollover") to zero, as would commonly be the case for other values that are incremented beyond their maximum value. As will be apparent, the size of the detection counter as well as the values of I and D will be factors in the performance of the hot spot detector. A larger detection counter will generally result in a longer latency until hot spots are detected, while a smaller detection counter will generally result in a shorter latency.

Furthermore, the values of I and D, and likewise the relationship between I and D, may be adjusted during execution. For example, if the processor is running and an excessive number of hot spots are detected, the ratio of I and D may be adjusted to reduce the number of hot spot detections. Similarly, if very few or infrequent hot spots are detected, the values of, and the relationship between, I and D may be adjusted to increase the sensitivity of the detector so that hot spots are detected more frequently. Thus, the values of I and D may be changing dynamically as the execution characteristics of the code change. In this regard, the hot spot detector may be "tuned" during execution of the code.

Generally, the detection counter will initially be set to its maximum value. As branch instructions are encountered, it will be incremented and decremented by I and D in accordance with whether a non-hot spot candidate branch or a hot spot candidate branch has been encountered. As more and more hot spot candidate branches are encountered, the detection counter approaches zero. When the detection counter reaches zero, the operating system is notified of that condition and, as will be described in more detail to follow, the contents of the branch behavior buffer may be copied.

As will be apparent, the invention may be implemented according to many different alternative arrangements. For example, the branch behavior buffer may be provided with room for 2048 different entries, although it appears that a buffer with even as few as 512 entries will also work well.

According to one embodiment of the invention, the branch behavior buffer may be implemented as a two-way set associative buffer, where the buffer is comprised of two 1024-entry tables, and for any particular branch address there are two possible locations in which it can be stored at the same index in each table. Alternatively, the branch behavior buffer may be implemented as a four-way set associative buffer, or in some arrangements perhaps even a fully associative buffer may be provided. The branch address field may be up to 32 bits wide, although a tag of only the top 22 bits may be all that is necessary for a 2048 entry two-way set associate table, depending on the size and associativity of the table. Executed and taken fields may each be 9 bits in size, while the candidate threshold of 16 may work well when combined with a refresh interval of 4096 branches (resulting in a candidate execution ratio of 0.03125) and a reset interval of 65536 branches. The hot spot detection counter may be implemented as a 13 bit counter that may be incremented, for example, by a value of 2 and which may be decremented, for example, by a value of 1.

As can be seen, an important aspect of the present invention is that minimal operating system interruption is involved in the hot spot detection process. When activated, the branch behavior buffer is updated based upon retired branch instructions, and the hot spot detector is updated based upon hot spot candidate branch instruction information. The refresh timer clears non-hot spot candidates from the branch behavior buffer, while the reset timer periodically clears all entries from the branch behavior buffer. Finally, when the detection counter is decremented to zero, the operating system is notified and the information from the branch behavior buffer is made available for the operating system.

Figure 2A:
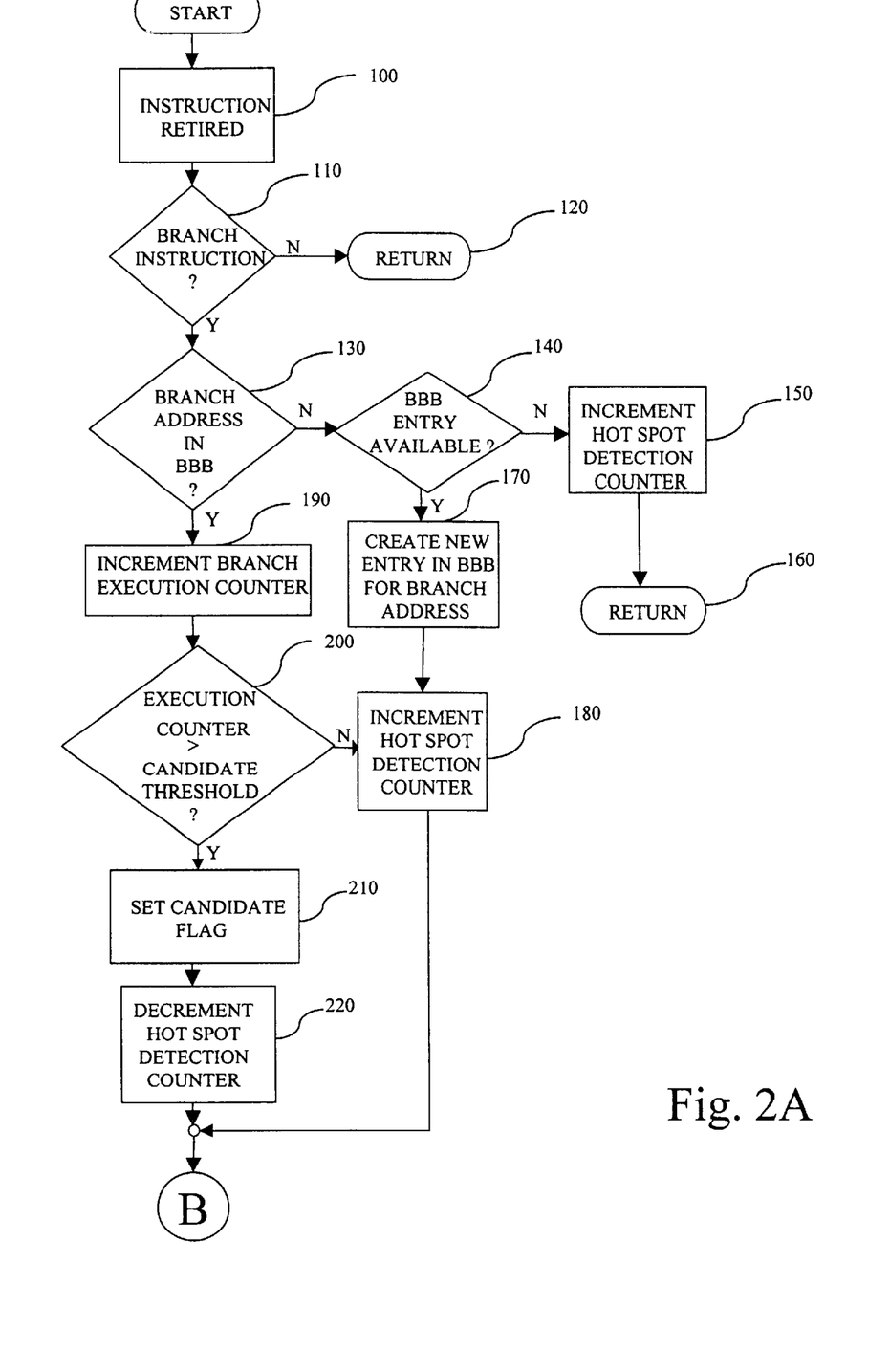
FIGS. 2A and 2B are flow diagrams that illustrate the steps performed by the hot spot detector of FIG. 1.

Turning now to FIG. 2A, there is shown a flow chart that illustrates the flow of steps performed in conjunction with the branch behavior buffer and hot spot detector of FIG. 1. As indicated earlier, the present invention may be advantageously implemented in the retirement stage of a pipelined processor. The first step, step 100, is performed when an instruction is retired. Next, in step 110, the retired instruction is examined to determine if it is a branch instruction. If it is not a branch instruction, then the process returns in step 120 and will be entered again upon another instruction being retired.

If, in step 110, the retired instruction is a branch instruction, then the branch behavior buffer is examined in step 130 to determine if there is already an entry in the branch behavior buffer for the branch address specified by the branch instruction and that the associated valid entry bit is set. If there is not already a valid entry for the branch address in the branch behavior buffer, then in step 140, the branch behavior buffer is checked to see if there is an entry available for the branch address. If there is no entry available for the branch address, then the process continues to step 150 where the hot spot detection counter is incremented and the process returns in step 160. In accordance with the example illustrated in FIG. 1, the value of the detection counter is incremented in step 150 by I.

It should be noted that for practicality, the size of the branch behavior buffer may result in being unable to add a new entry for several branch addresses, such as the situation that occurs when the routine reaches step 150. However, if the branch addresses are actually being frequently executed (i.e., part of a genuine hot spot), it is likely that the branch address will be entered into the branch behavior buffer after a refresh or reset cycle.

If in step 140, there is space in the branch behavior buffer to accommodate the new branch address, then in step 170 a new entry is created associated with the branch address. In this step, information relating to the branch address is filled into the branch behavior buffer, the executed counter is set to one, the taken counter is set to 0 and, initially, the candidate flag is cleared. At this point, the entry in the branch behavior buffer for the new branch address has been completed and the process continues to step 180 where the detection counter of the hot spot detection counter is incremented by I and the process continues to step 230.

If, in step 130, it is determined that the branch address already has an entry in the branch behavior buffer, the process continues to step 190 where the branch execution counter for the associated branch address is incremented. Next, in step 200, the execution counter is compared to a predetermined candidate threshold value to determine whether the branch address has been encountered frequently enough in the present interval to qualify the branch address as a hot spot candidate.

The candidate threshold value is a predetermined value that affects how many times a particular branch address must be encountered in an interval for it to qualify as a hot spot candidate. The candidate threshold value may be a variable that may be adjusted depending upon characteristics of the code being considered. If the candidate threshold value is set too low, the hot spot detection results may not be meaningful because the branch behavior buffer may be filled too quickly with information from less important branch instructions thereby preventing more important branches from being discovered and possibly reporting excessively large hot spots. On the other hand, if the candidate threshold value is set too high, the hot spot detection results may also not be meaningful, because very few if any hot spots may be detected because no branch instruction addresses are encountered frequently enough prior to refreshing or resetting of the branch behavior buffer. As should be evident to one of skill in the art, the candidate threshold value may be adjusted while the hot spot detection routine is being performed in order to result in the detection of only those few genuine hot spots that might justify optimization.

If, in step 200, the execution counter for the associated branch address in the branch behavior buffer does not exceed the candidate threshold value, the routine continues to step 180 where the detection counter of the hot spot detector is incremented by I and the routine continues to step 230. Otherwise, in step 200, if the execution counter for the associated branch address does exceed the candidate threshold value, the routine continues to step 210 where the candidate flag is set for the associated branch address, indicating that this branch address is in a potential hot spot. Next, in step 220, the hot spot detection counter is decremented by D and the routine continues to step 230.

In step 230 it is determined whether the branch specified by the current branch instruction was taken. This step could be performed by, for example, comparing the branch address computed by the branch instruction to the program counter of the next executed instruction, which is available after the current instruction retires; if the values are the same, this indicates the branch was taken, but if the values differ, this indicates that the branch was not taken. If it is determined in step 230 that the branch was taken, the routine continues to step 240 where the taken counter in the branch behavior buffer entry associated with the branch address for the current branch instruction is incremented, and the routine continues to step 250. Otherwise, in step 230, if it is determined that the branch was not taken, the routine continues directly to step 250.

Figure 2B:
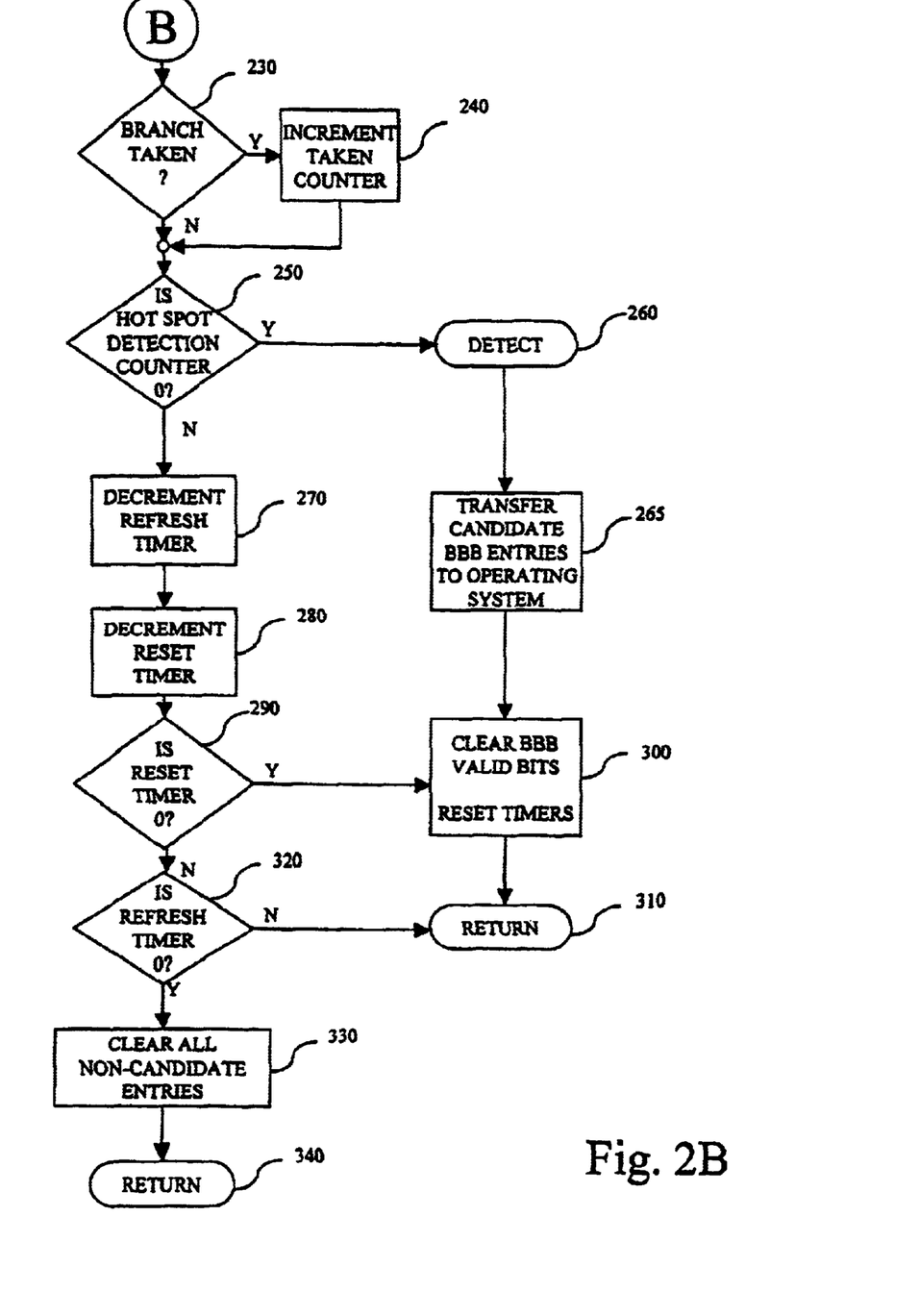

In step 250, the detection counter of the hot spot detection counter is examined to determine if it has reached 0. If it has reached zero, this indicates that a hot spot has been detected during the current interval and the process continues to step 260 where the operating system is notified of the hot spot detection. As shown in step 265, after the operating system is notified, the contents of the branch behavior buffer will be copied or used by the operating system to update the known program hot spots, such as in the monitor table, which will be described in more detail later. In addition, the operating system may use the hot spot information from the branch behavior buffer to perform runtime optimization of the hot spots. The process then continues to step 300 in which the branch behavior buffer entries are invalidated and the refresh and reset timers are set to their maximum values. Otherwise, in step 250, if the hot spot detection counter is not 0, then the process continues to step 270.

In step 270, the refresh timer is decremented, and in step 280, the reset timer is also decremented. In step 290, the reset timer is checked to determine if it has been decremented to 0 and, if it has, the routine continues to step 300 where all of the valid entry bits in the branch behavior buffer are cleared, the reset and refresh timers are reset and the routine returns in step 310. Otherwise, in step 290, if the reset timer is not yet 0, the routine continues to step 320 where the refresh timer is checked to determine if it has been decremented to 0. If the refresh timer is not yet 0, the routine returns in step 310. However, if the refresh timer is 0, the routine continues to step 330 where all the valid bits corresponding to the branch behavior buffer entries for addresses which do not have a candidate flag set are cleared. This purges the branch behavior buffer of branches that are not encountered frequently enough to qualify as hot spot candidates, so that buffer space may be available for branches that might qualify as hot spot candidates. Next, the routine returns in step 340.

After hot spots have been detected using the hot spot detector described in connection with FIGS. 1 and 2, the operating system is notified and optimization of the hot spot code may be performed. In addition, information relating to the hot spot branch addresses may be entered into a monitor table that tracks where execution of the program has strayed from the hot spots. After the hot spot detector has reported an initial set of hot spots to the operating system, it may be deactivated as long as the program continues to operate in the hot spots. However, when the monitor table senses that the program is no longer operating in a hot spot region, the hot spot detector may be activated again to determine if a new hot spot has been encountered.

Figure 3:
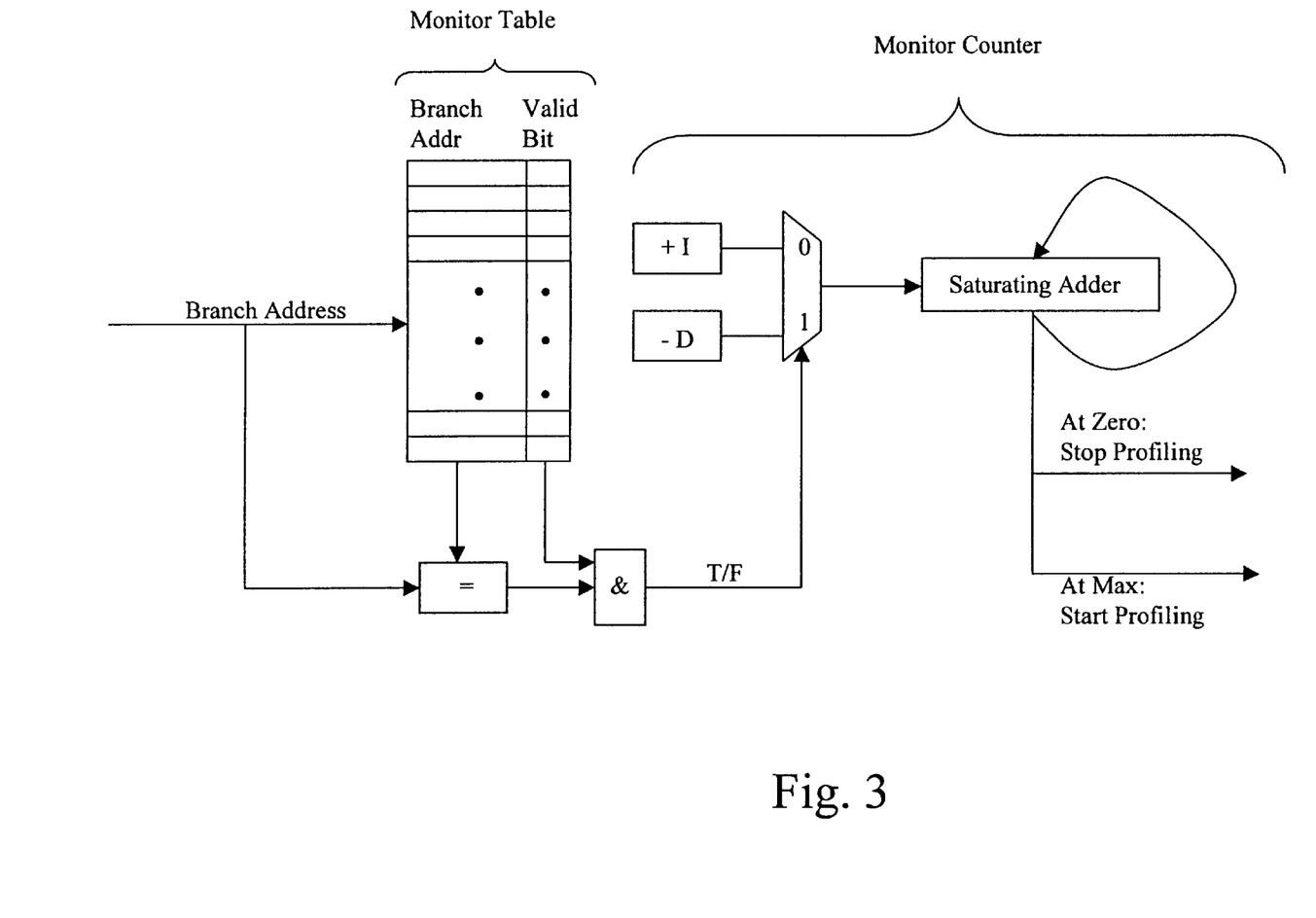
FIG. 3 is a schematic diagram illustrating the components of the hot spot monitor in accordance with one embodiment of the present invention.

Turning now to FIG. 3, there is illustrated a schematic diagram that shows the various components of the hot spot monitor in connection with one embodiment of the present invention. The monitor is comprised of a monitor table and a saturating up-down counter that may be weighted as illustrated such that counting up is done in an increment of I and counting down is done in a decrement of D. Similar to the hot spot detector, when a branch instruction is retired, the hot spot monitor table is examined to determine if there is an entry in the monitor table, i.e., whether the valid bit for the particular branch address has been set. In general, an entry will appear with the valid bit set if the branch address has previously been determined to be a hot spot by the hot spot detector. In other words, the branch address makes its way to the monitor table from previous detection by the hot spot detector.

If the branch address is found in the table with the valid bit set, the monitor counter is decremented by D. Otherwise, if the branch address is not found in the table, or if it is present but the valid bit is not set, the monitor counter is incremented by I. It should be noted that the valid bit is provided in the monitor table as a convenient way to determine if the address appears in the table as a result of being intentionally set. In other words, when the table is cleared, all of the valid bits may be set to 0, without having to clear all the address fields. Additionally, in some architectures, a branch address of 0 is possible, so it is preferable to use a separate valid bit to indicate whether there is branch address entry in the table.

In a situation where the monitor counter is aggressively decremented, such as, for example, by frequent decrementing resulting from encountering hot spot branch addresses in the monitor table, the monitor counter may reach 0, a condition that indicates program execution is concentrated in hot spots. In this case, it is preferable to disable the hot spot detector, since it is unnecessary and costly to optimize a hot spot that has already been detected. On the other hand, in a situation where the monitor counter is aggressively incremented, such as, for example, by frequent incrementing resulting from encountering branch instructions that are not designated as hot spots with a valid bit set in the monitor table, the monitor counter may reach its maximum value, a condition that indicates program execution has strayed from the known set of hot spots. In this case, it is preferable to enable the hot spot detector to detect new hot spots.

It is preferable to continue to operate the hot spot monitor of FIG. 3 while the hot spot detector of FIG. 1 attempts to detect new hot spots, because it is possible that the program execution has strayed from known hot spots only briefly and may return once again before any additional hot spots are detected. In this situation, the monitor counter of the hot spot monitor will again reach 0 due to frequent hot spot branches and the hot spot detector will be disabled again until the monitor counter reaches its maximum.

Figure 4:
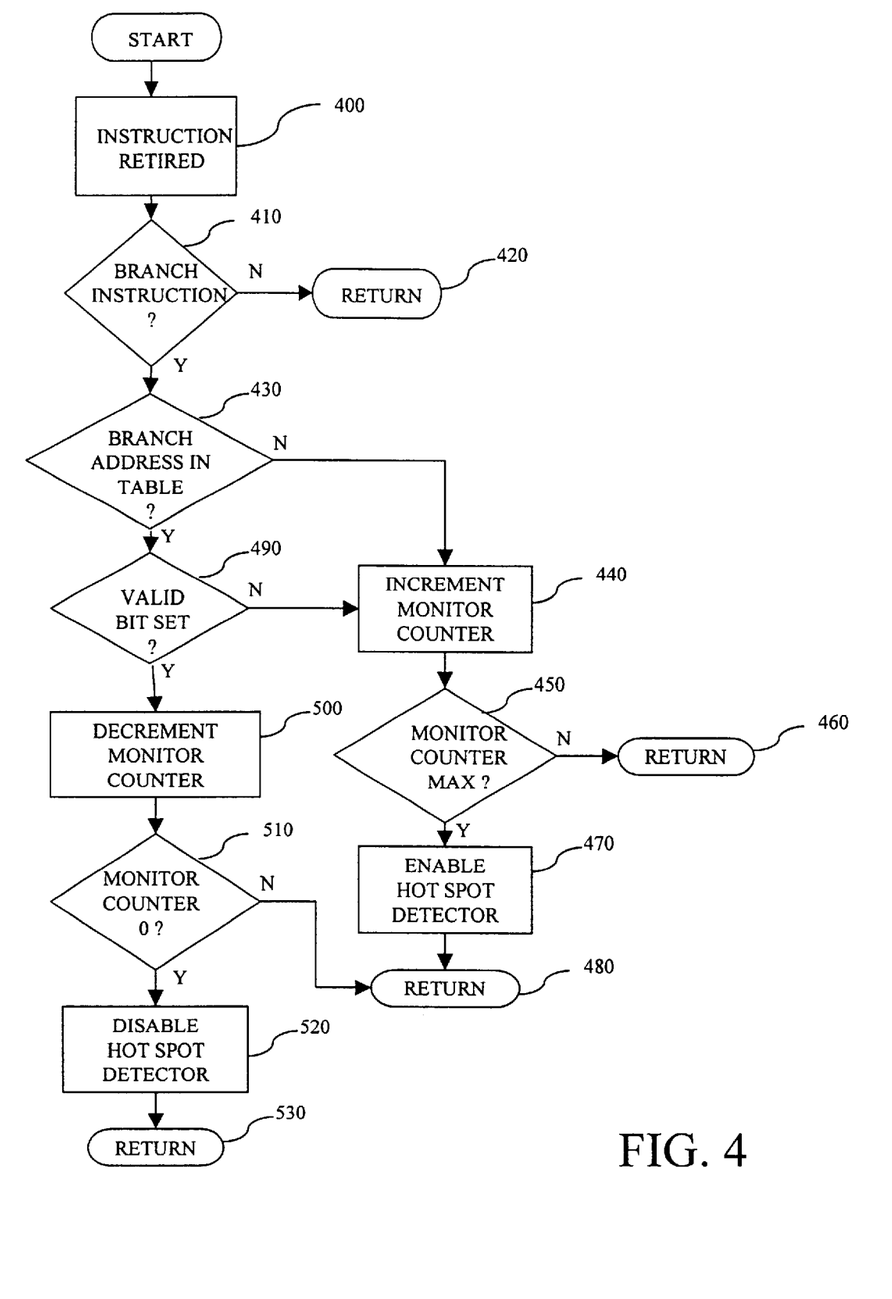
FIG. 4 is a flow diagram that illustrates the steps performed by the hot spot monitor of FIG. 3.

Turning now to FIG. 4, there is shown a flow chart that illustrates the flow of steps performed in conjunction with the hot spot monitor of FIG. 3. The first step, step 400, is performed when an instruction is retired. Next, in step 410, the retired instruction is examined to determine if it is a branch instruction. If it is not a branch instruction, then the process returns in step 420 and will be entered again upon another instruction being retired. If, in step 410, the retired instruction is a branch instruction, then the monitor table is examined in step 430 to determine if there is an entry corresponding to the branch address. If there is not an entry in the monitor table, the routine continues to step 440 where the monitor counter is incremented, indicating that a non-hot spot branch instruction has been encountered. Otherwise, in step 430, if there is an entry in the monitor table that corresponds to the branch address, the routine continues to step 490.

If, in step 490, there is an entry in the monitor table corresponding to the retired branch address but the valid bit for that entry is not set, the process continues to step 440 where the monitor counter is incremented, indicating that a non-hot spot branch instruction has been encountered. After the monitor counter is incremented by I in step 440, the routine continues to step 450 where the monitor counter is checked to determine if it has been incremented to its maximum value. If the monitor counter has not reached its maximum value, the routine returns in step 460. Otherwise, in step 450, if the monitor counter has reached its maximum value, the routine continues to step 470 indicating that the program execution has strayed from the known hot spots in the monitor table. In step 470, the hot spot detector is enabled to detect additional hot spots, and the routine returns in step 480.

Otherwise, in step 490, if the valid bit corresponding the retired branch instruction is set, the routine continues to step 500 indicating that a known hot spot instruction has been retired. In step 500, the monitor counter is decremented by D and the routine continues to step 510 where the monitor counter is checked to determine if it has been decremented to 0. If the monitor counter has not been decremented to 0, the routine returns in step 480. Otherwise, in step 510, if the monitor counter has been decremented to 0, the routine continues to step 520 indicating that the program execution is concentrated in known hot spots within the monitor table, the hot spot detector is disabled and the routine returns in step 530.

As can be seen from the foregoing, the present invention provides a method and apparatus for efficiently detecting and monitoring program hot spots. The invention may be advantageously implemented in hardware where two main memory buffers are allocated for the branch behavior buffer and the hot spot monitor table. In addition, several registers may be provided for the refresh timer, the reset timer, the hot spot detection counter and the monitor counter. The logic of the flow charts illustrated in FIGS. 2 and 4 may also be readily implemented in hardware. Thus, the present invention may be implemented in hardware independent of other hardware mechanisms in the data processing unit and it will not degrade processor performance, complicate the processor design or increase cycle time.

What is claimed is:

1. A method for detecting instruction execution hot spots in a data processing unit, said data processing unit including a buffer with a plurality of entries having at least a branch identifying field and a branch counter, when a branch instruction is executed by the data processing unit, performing the steps comprising:
   if an entry is not present in said buffer that corresponds to the branch address associated with said branch instruction, creating an entry in the buffer that includes information in the branch identifying field corresponding to the branch address associated with said branch instruction and an initialized branch counter value for said entry;
   if an entry is present in said buffer that corresponds to the branch address associated with said branch instruction, updating the branch counter corresponding to said entry; and
   at a first interval, clearing all buffer entries for which the corresponding branch counter value is less than a candidate threshold value.

2. The method according to claim 1 further comprising the step of, at a second interval greater than said first interval, clearing all buffer entries.

3. The method according to claim 2 wherein the first interval is based upon the execution of a first number of branch instructions, and the second interval is based upon the execution of a second number of branch instructions.

4. The method according to claim 1 further comprising updating a branch taken counter for each of said plurality of entries of said buffer when a true condition is determined for the corresponding branch instruction.

5. The method according to claim 1 further comprising indicating whether the information in each of said plurality of entries of said buffer is in a set condition or a cleared condition.

6. The method according to claim 1 further comprising setting a candidate flag when a branch counter value associated with the entry of the buffer has surpassed a candidate threshold value.

7. A method for detecting instruction execution hot spots in a data processing unit, wherein said data processing unit includes a buffer with a plurality of entries having at least a branch identifying field, a branch counter, and an up-down counter, when a branch instruction is executed by the data processing unit, performing the steps comprising:
   if an entry is not present in said buffer that corresponds to the branch address associated with said branch instruction, creating an entry in the buffer that includes information in the branch identifying field corresponding to the branch address associated with said branch instruction and an initialized branch counter value for said entry;
   if an entry is present in said buffer that corresponds to the branch address associated with said branch instruction, updating the branch counter corresponding to said entry; and
   if an entry is present in said buffer that corresponds to the branch address associated with the branch instruction and the corresponding branch counter value is at least as great as a candidate threshold value, updating in a first direction said counter by a first value, otherwise updating said counter in a second direction, opposite of said first direction, by a second value.

8. The method according to claim 7 further comprising the step of notifying a supervisory means associated with the data processing unit in response to the up-down counter being updated beyond a predetermined value.

9. An apparatus for instruction execution hot spot detection comprising:
   a data processing unit for executing a sequence of instructions;
   a branch behavior buffer capable of storing information for a plurality of entries, where each entry comprises at least branch identifying information and a branch counter;
   a refresh timer for clearing, at a first interval, all entries in said branch behavior buffer which have a branch counter value less than a candidate threshold value;
   a hot spot detection up-down counter;
   a means for notifying a supervisory means associated with the data processing unit when the hot spot detection up-down counter has been completely decremented;
   a means for updating the hot spot detection up-down counter in a first direction by a first value when a branch instruction with an associated branch address is executed for which there is a corresponding entry in the branch behavior buffer with a branch counter value at least as great as said candidate threshold value; and
   a means for updating the hot spot detection up-down counter in a second direction, opposite said first direction, by a second value when a branch instruction with an associated branch address is executed for which there is no corresponding entry in the branch behavior buffer with a branch counter value at least as great as said candidate threshold value.

10. The apparatus according to claim 9 wherein said first value is less than said second value.

11. The apparatus according to claim 10 wherein said first value is half of said second value.

12. The apparatus according to claim 9 wherein said first value may be adjusted by said supervisory means.

13. The apparatus according to claim 9 wherein said second value may be adjusted by said supervisory means.

14. The apparatus according to claim 9 wherein the hot spot detection up-down counter is a saturating counter which maintains its greatest value when given a signal to increment that would cause the hot spot detection up-down counter to exceed its greatest value and which maintains its lowest value when given a signal to decrement that would cause the hot spot detection up-down counter to drop below its lowest value.

15. The apparatus according to claim 9 wherein said apparatus further comprises a reset timer for clearing, at a second interval, all entries in said branch behavior buffer.

16. The apparatus according to claim 15 where said second interval is greater than said first interval.

17. The apparatus according to claim 16 where the ratio of said second interval to said first interval is greater than 5.

18. The apparatus according to claim 15 where said second interval is based upon the number of branch instructions executed by the data processing unit.

19. The apparatus according to claim 15 where said second interval is based upon the number of instructions executed by the data processing unit.

20. The apparatus according to claim 9 where the first interval is based upon the number of branch instructions executed by the data processing unit.

21. The apparatus according to claim 9 where the first interval is based upon the number of instructions executed by the data processing unit.

22. The apparatus according to claim 9 wherein each entry of said branch behavior buffer includes an associated valid indicator that indicates whether the information in the associated entry of the branch behavior buffer is in a set condition or a cleared condition.

23. The apparatus according to claim 9 wherein each entry of said branch behavior buffer includes an associated taken counter that is incremented when a true condition is determined for the corresponding branch instruction.

24. The apparatus according to claim 9 wherein each entry of said branch behavior buffer includes an associated candidate flag that indicates whether the branch counter value of the associated entry is at least as great as said candidate threshold value.

25. The apparatus according to claim 9 wherein said first value may be adjusted by the supervisory means.

26. The apparatus according to claim 9 wherein said second value may be adjusted by the supervisory means.

27. An apparatus for instruction execution hot spot detection and monitoring comprising:
   a data processing unit for executing a sequence of instructions;
   a detector comprising:
      a branch behavior buffer for storing information for a plurality of entries, where each entry comprises at least branch identifying information and a branch counter;
      a refresh timer for clearing, at a first interval, all entries in said branch behavior buffer for which the branch counter value is less than a candidate threshold value;
      a reset timer for clearing, at a second interval, all entries in said branch behavior buffer;
      a detector up-down counter and means for generating a hot spot detection signal when the detector up-down counter has been updated beyond a detector counter predetermined value;
      a means for updating the detector up-down counter in a first direction by a first value when a branch instruction is executed for which there is a corresponding branch address entry in the branch behavior buffer for which the branch counter value is at least as great as said candidate threshold value; and
      a means for updating the detector up-down counter in a second direction, opposite of said first direction, by a second value when a branch instruction with an associated branch address is executed for which there is no corresponding branch address entry in the branch behavior buffer for which the branch counter value is at least as great as said candidate threshold value; and
   a monitor comprising:
      a monitor buffer for storing information for a plurality of entries where each entry comprises at least branch identifying information;
      a monitor up-down counter;
      a means for generating a signal to enable the detector when the monitor up-down counter has been updated beyond a first monitor counter value, and generating a signal to disable the detector when the monitor up-down counter has been updated beyond a second monitor counter value;
      a means for updating the monitor up-down counter in a third direction by a third value when a branch instruction is executed for which there is a corresponding branch address entry in the monitor buffer; and
      a means for updating the monitor up-down counter in a fourth direction, opposite of said third direction, by a fourth value when a branch instruction is executed for which there is no monitor buffer entry corresponding to the branch address of the branch instruction.

28. The apparatus according to 27 wherein said first value is less than said second value.

29. The apparatus according to claim 28 wherein said first value is half of the said second value.

30. The apparatus according to claim 27 wherein said third value is the same as said fourth value.

31. The apparatus according to claim 27 wherein the detector up-down counter is a saturating counter which maintains its greatest value when given a signal to update in a positive direction that would cause the hot spot detection up-down counter to exceed its greatest value and which maintains its lowest value when given a signal to update in a negative direction that would cause the hot spot detection up-down counter to drop below its lowest value.

32. The apparatus according to claim 27 wherein the monitor up-down counter is a saturating counter which maintains its greatest value when given a signal to update in a positive direction that would cause the monitor up-down counter to exceed its greatest value and which maintains its lowest value when given a signal to update in a negative direction that would cause the monitor up-down counter to drop below its lowest value.

33. The apparatus according to claim 27 where said second interval is greater than said first interval.

34. The apparatus according to claim 33 where the ratio of said second interval to said first interval is greater than 5.

35. The apparatus according to claim 27 where said first interval is based upon the number of branch instructions executed by the data processing unit.

36. The apparatus according to claim 27 where said second interval is based upon the number of branch instructions executed by the data processing unit.

37. The apparatus according to claim 27 where said first interval is based upon the number of instructions executed by the data processing unit.

38. The apparatus according to claim 27 where said second interval is based upon the number of instructions executed by the data processing unit.

39. The apparatus according to claim 27 wherein each entry of said branch behavior buffer further comprises a valid indicator that indicates whether the information in the branch behavior buffer entry is in a set condition or a cleared condition.

40. The apparatus according to claim 27 wherein each entry of said monitor buffer further comprises a valid indicator that indicates whether the information in the monitor buffer entry is in a set condition or a cleared condition.

41. The apparatus according to claim 27 wherein each entry of said branch behavior buffer further includes an associated taken counter that is incremented when a true condition is determined for the corresponding branch instruction.

42. The apparatus of claim 27 wherein each entry of said branch behavior buffer includes an associated candidate flag that indicates whether the branch counter value of the associated entry is at least as great as said candidate threshold value.

43. A method for detecting a most frequently occurring behavior characteristic relating to a plurality of related events of a data processing unit executing instruction code, said method comprising the steps of:

upon detecting each of a plurality of related events associated with said most frequently occurring behavior characteristic, storing at least identifying and frequency information relating to each said event;

at a first interval, clearing at least said identifying and frequency information for those of the plurality of related events having frequency information below a threshold; and notifying a supervisory means associated with said data processing unit of at least the identifying information relating to said plurality of events having frequency information above said threshold.

44. The method of claim 43 wherein said first interval is based upon a first number of events.

45. The method of claim 43 wherein after a second interval, all identifying and frequency information relating to all of said plurality of events are cleared.

46. The method of claim 45 wherein said second interval is based upon a second number of events that is greater than said plurality of events.

47. The method of claim 43 wherein said most frequently occurring behavior characteristic is hot spot instruction code execution and said identifying information includes at least identifying information of a branch instruction.

48. The method of claim 43 wherein said most frequently occurring behavior characteristic is a behavior characteristic selected from the group comprising most frequently used instruction code segments, most frequently used instruction code sets, most frequently accessed memory locations, most frequently executed memory instructions, most frequently accessed cache lines and most frequently occurring cache misses.

49. The method of claim 43 where said frequency information is updated upon every occurrence of an event associated with the most frequently occurring behavior characteristic.

50. An apparatus for detecting a most frequently occurring behavior characteristic relating to a plurality of related events of a data processing unit executing instruction code, said apparatus comprising:

first means for detecting each of a plurality of events which occurs associated with said most frequently occurring behavior characteristic, and for storing at least identifying and frequency information relating to each said event;

second means for clearing at least said identifying and frequency information for those of the plurality of related events having frequency information below a threshold;

third means for clearing all identifying and frequency information relating to all of said plurality of event; and fourth means for reporting to a supervisory means at least said identifying information for those of the plurality of related events having frequency information above a threshold.

51. The apparatus according to claim 50 wherein said second means operates at a first interval based upon a first number of events.

52. The apparatus according to claim 51 wherein said third means operates at a second interval based upon a second number of events that is greater than said plurality of events.

53. The apparatus according to claim 50 wherein said fourth means comprises:

a detector up-down counter;

a means for generating a detection signal when the detector up-down counter has been updated beyond a detector counter predetermined value;

a means for updating the detector up-down counter in a first direction by a first value upon the occurrence of an event having frequency information above said threshold; and a means for updating the detector up-down counter in a second direction, opposite of said first direction, by a second value upon the occurrence of an event which does not have frequency information which is at least as great as said threshold.

54. The apparatus according to claim 50 wherein said most frequently occurring behavior characteristic is a behavior characteristic selected from the group comprising most frequently used instruction code segments, most frequently accessed memory locations, most frequently accessed cache lines and most frequently occurring cache misses.

55. The apparatus according to claim 50 wherein said frequency information is updated upon every occurrence of an event associated with the most frequently occurring behavior characteristic.

56. An apparatus for detecting and monitoring a most frequently occurring behavior characteristic relating to a plurality of related events of a data processing unit executing instruction code, said apparatus comprising:

detecting means for detecting each of a plurality of events which occurs associated with said most frequently occurring behavior characteristic and for storing at least identifying information relating to each said event; and monitor means for monitoring the instruction code execution of said data processing unit with respect to said identifying information and for selectively deactivating said detecting means based upon first predetermined criteria from a comparison of said identifying information to information from monitoring said instruction code execution.

57. The apparatus of claim 56 wherein said monitor means further comprises reactivating said detecting means based upon second predetermined criteria from a comparison of said identifying information to information from monitoring said instruction code execution.

58. An apparatus for hot spot detection and monitoring of instructions executed by a data processor, said apparatus comprising:

a hot spot detector for detecting and storing, at least temporarily, identifying information relating to most frequently used instructions; and a monitor for monitoring instruction execution with respect to said most frequently used instructions, said monitor including means for selectively deactivating said hot spot detector when said monitor determines that said instruction execution is executing said most frequently used instructions at a rate that exceeds a first predetermined threshold.

59. The apparatus according to claim 58 wherein said monitor further comprises means for reactivating said hot spot detector when said monitor determines that said instruction execution is executing said most frequently used instructions at a rate less than a second predetermined threshold.

* * * * *